United States Patent [19]

Sato

[11] Patent Number: 5,265,824
[45] Date of Patent: Nov. 30, 1993

[54] TWO-BEARING REEL WITH CLICK MECHANISM

[75] Inventor: Jun Sato, Sakai, Japan

[73] Assignee: Shimano, Inc., Osaka, Japan

[21] Appl. No.: 669,858

[22] Filed: Mar. 15, 1991

[30] Foreign Application Priority Data

Mar. 27, 1990 [JP] Japan .................. 2-32103[U]

[51] Int. Cl.⁵ ..................................... A01K 89/015
[52] U.S. Cl. ..................................... 242/268; 242/306
[58] Field of Search ............... 242/306, 268, 267, 264, 242/245

[56] References Cited

U.S. PATENT DOCUMENTS

| | | | |
|---|---|---|---|
| 1,967,678 | 7/1934 | Miller | 242/268 |
| 2,209,598 | 7/1940 | Coxe | 242/268 |
| 2,485,741 | 10/1949 | King | 242/306 X |
| 4,513,925 | 4/1985 | Yamaguchi | 242/245 |
| 4,732,348 | 3/1988 | Young | 242/267 X |
| 4,899,953 | 2/1990 | Toda | 242/268 |
| 5,007,602 | 4/1991 | Carlsson | 242/306 X |
| 5,149,009 | 9/1992 | Sato | 242/306 X |

*Primary Examiner*—Katherine Matecki
*Attorney, Agent, or Firm*—Dickstein, Shapiro & Morin

[57] ABSTRACT

A two-bearing reel includes a handle shaft, a drag control member relatively rotatable to the handle shaft, and a click mechanism disposed between a member provided in the handle shaft and a member provided in the drag control member and supporting the drag control member. The click mechanism maintains the drag control member in place every time it is pivoted by a predetermined amount. The click mechanism includes a concavo-convex surface peripherally continuously defined in either one of the member provided in the handle shaft and the member provided in the drag control member, and a ball member engageable with the concavo-convex surface and an elastic member urging the ball member toward a radial direction with the ball member being rollable provided in the other of the member provided in the handle shaft and the member provided in the drag control member.

6 Claims, 4 Drawing Sheets

TWO-BEARING REEL WITH CLICK MECHANISM

BACKGROUND OF THE INVENTION

1. Field of the Invention

The present invention relates to a two-bearing reel, and more particularly to a two-bearing reel comprising a handle shaft, a drag control member relatively pivotable with the handle shaft, and a click mechanism disposed between a member mounted on the handle shaft and a member mounted on the drag control member for maintaining the drag control member in place every time pivoted by a predetermined amount.

2. Description of the Related Art

An example of the conventional two-bearing reel of the above-noted type is disclosed in Japanese Utility Model Application "Kokai" No. 63-68774, which shows a tubular portion provided in the drag control member defining a concavo-convex surface in an inner periphery thereof, and a spring member provided in the handle shaft to be engageable with the concavo-convex surface thereby to form the click mechanism.

With such a conventional reel, as the drag control member is pivoted, the spring member is engaged with and disengaged from the concavo-convex surface repeatedly to generate click sounds successively and to maintain the drag control member in a position where the spring member engages a concave portion.

However, the drag control member is relatively frequently controlled during fishing, which increases the frequency of engagement and disengagement between the spring member and the concavo-convex surface as used. In addition, a large friction force is exerted between a convex portion and the spring member at the time of engagement or disengagement therebetween, as a result of which an operation of the drag control member tends to be toilsome. Also, the respective members are abraded to deteriorate the function of the members, which requires an improvement.

A primary object of the present invention is to provide a two-bearing reel comprising a click mechanism easily operable without deteriorating the function of the drag control member even if frequently pivoted.

SUMMARY OF THE INVENTION

In order to achieve the above-noted object, the present invention is characterized by a two-bearing reel comprising a click mechanism including a concavo-convex surface peripherally and continuously defined in either one of a member provided in a handle shaft and a member attached a drag control member, a ball member provided in the other of the members to be engageable with the concavo-convex surface, and an elastic member urging the ball member toward a radial direction with the ball member being rollable.

A function and an effect of the present invention are as follows.

As can be seen from FIGS. 1 though 3, when the drag control member 5 is pivoted, the ball member 19 is rotatable when climbing over a convex portion of the concavo-convex surface, as a result of which a friction force exerted between the ball member and the convex portion is relieved by rotation of the ball member 19.

More particularly, the click mechanism A of the present invention is less deformable even in the concavo-convex surface if used for a long term. In addition, a resistance caused in operating the mechanism can be reduced.

Thus, such a two-bearing reel can be realized as includes the click mechanism in which even if the drag control member is frequently pivoted for a long term, a maintaining force and a function of click sounds are not extremely deteriorated, and furthermore, an easy operation is possible.

Other objects, features and advantages will be apparent from the following description with reference to the accompanying drawings.

BRIEF DESCRIPTION OF THE DRAWINGS

The drawings show a two-bearing reel embodying the present invention in which.

DETAILED DESCRIPTION OF THE PREFERRED EMBODIMENTS

The present invention will be described in detail referring to the accompanying drawings.

Figure 1:
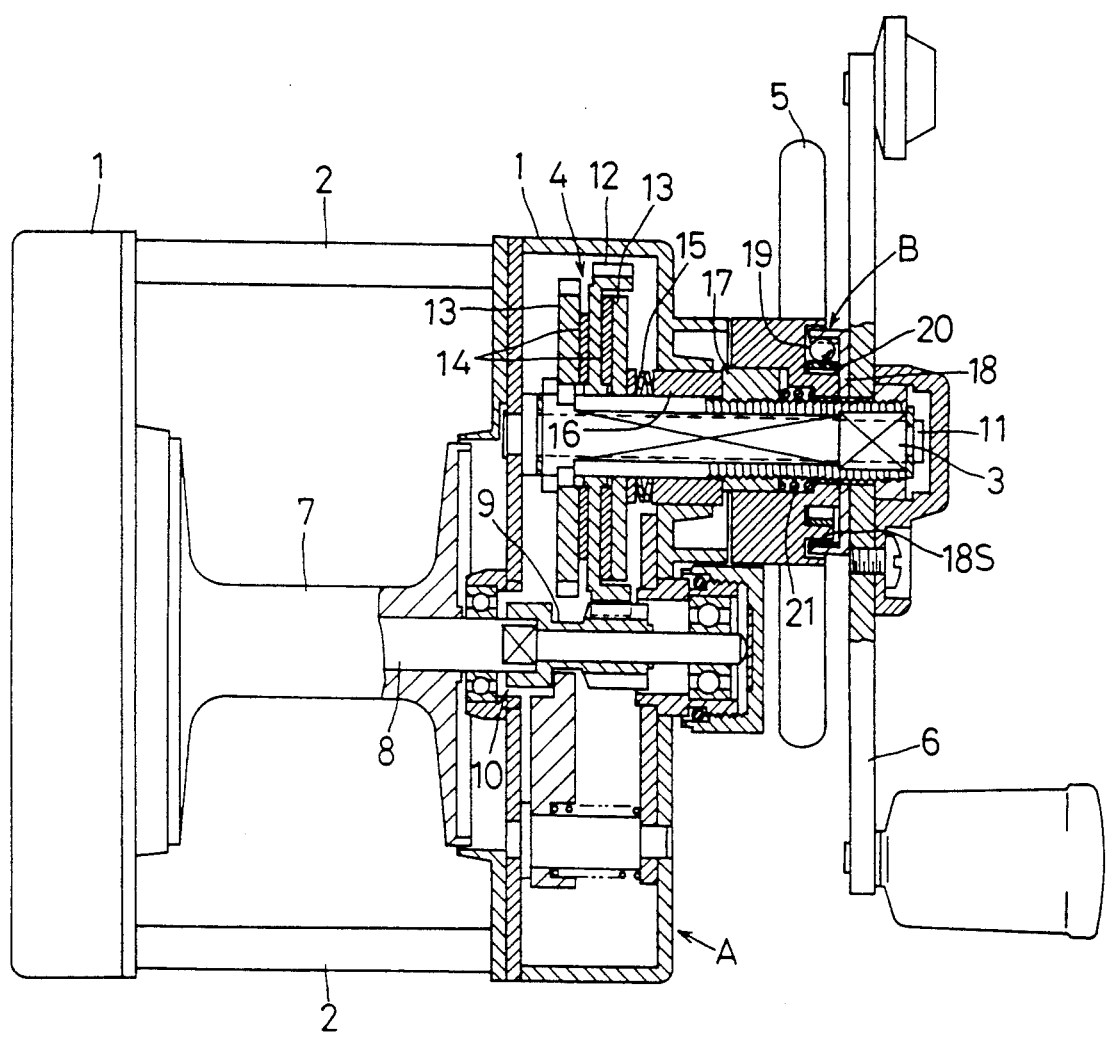
FIG. 1 is a partially broken away top plan view of the reel.
Figure 2:
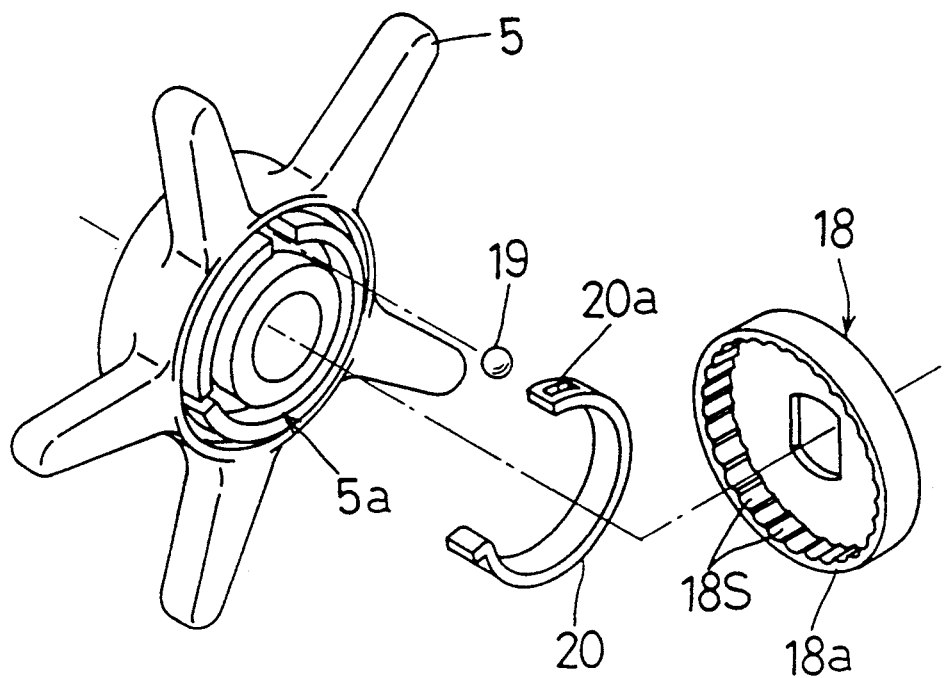
FIG. 2 is an exploded perspective view of a click mechanism.
Figure 3:
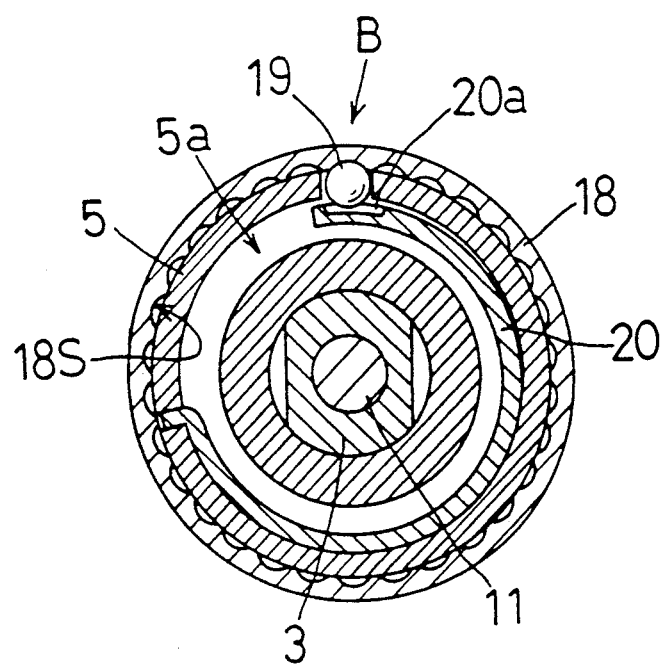
FIG. 3 is a vertical section of the click mechanism.

As shown in FIG. 1, a two-bearing reel relating to the present invention comprises a reel body A including right and left side cases 1 interconnected through rods 2. A spool 7 is disposed between the right and left side cases 1, and a handle shaft 3 extends from the right side case 1 of the reel body A. The handle shaft 3 carries a drag mechanism 4, a drag control member 5 and a handle 6 for taking up a fishing line, attached thereto, respectively.

A spool drive structure in the handle 6 will be described next. A spool shaft 8 is pivotably supported at one end thereof within the right side case 1. An input sleeve 9 is freely fitted on the end portion of the spool shaft 8. A fit-type clutch 10 is disposed between one end of the input sleeve 9 and the spool shaft 8.

The drag mechanism 4 will be set forth next. The handle shaft 3 is hollow and has a support shaft 11 inserted therein. The support shaft 11 is supported by the right side case 1 whereby the handle shaft 3 is indirectly supported by the right side case 1. The drag mechanism 4 includes a drive gear 12 freely fitted on the handle shaft 3, pressure plates 13 and friction plates 14 disposed at opposite sides of the drive gear 12, respectively, and a pressure spring 15. A pressing member 16 acting upon the drag mechanism 4 is attached to an outer end portion of the handle shaft 3 relative to the drag mechanism 4 to be rotatable in unison with the handle shaft 3 and slidable in an axial direction of the handle shaft. A nut member 17 is screwed to a further outer end portion of the handle shaft 3 relative to the pressing member 16. The drag control member 5 is fitted on the nut member 17 for torque transmission.

A click mechanism B is disposed between the handle 6 and the drag control member 5.

The click mechanism B comprises a member 18 rotatable in unison with the handle shaft 3, a ball member 19 engageable with and disengageable from a concavo-convex surface 18S continuously defined in an inner periphery of a tubular portion 18a of the member 18, an elastic member 20 urging the ball member 19 toward a radical direction with the ball member being rollable, and the drag control member 5 defining an annular groove 5a for supporting the ball member 19 and the elastic member 20, respectively. With the click mechanism B, when the drag control member 5 is pivoted, the ball member 19 rotates and repeatedly engages and disengages from the concavo-convex surface 18S thereby to generate click sounds. The drag control member 5 is maintained in place with the ball member 19 engaging a concave portion.

The elastic member 20 is made of a plate spring and defines a groove 20a in a contact portion with the ball member 19 for stabilizing a relative position therebetween. A compression spring 21 is disposed between the nut member 17 and the drag control member 5.

Another embodiment of the present invention will be described hereinafter.

Figure 4:
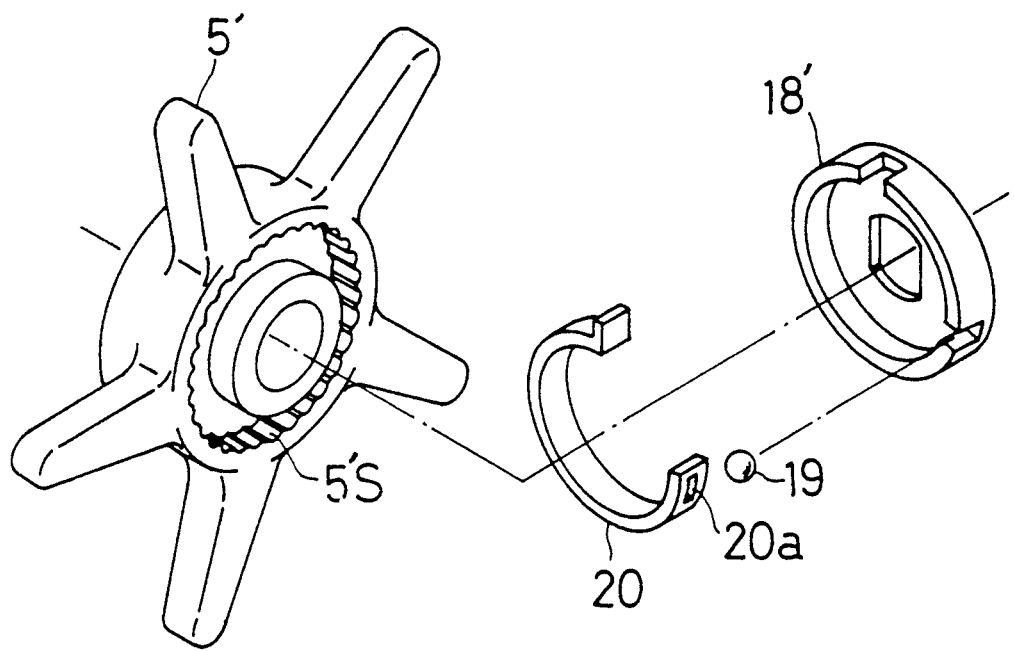
FIG. 4 is an exploded perspective view of another embodiment of the click mechanism.

Apart from the foregoing embodiment, the present invention may be practiced in a manner as shown in FIG. 4.

In this embodiment, the click mechanism B comprises a concavo-convex surface 5'S defined in an inner periphery of a drag control member 5', the ball member 19 engageable with and disengageable from the concavo-convex surface 5'S, the elastic member 20 urging the ball member 19 toward the radial direction with the ball member 19 being rollable, and a member 18' rotatable in unison with the handle shaft 3. In a similar manner to the foregoing embodiment, when the drag control member 5' is pivoted, the ball member 19 rotates and repeatedly engages and disengages from the concavo-convex surface 5'S thereby to generate click sounds. The drag control member 5' is maintained in place with the ball member 19 engaging the concave portion. However, the member 18' rotatable in unison with the handle shaft 3 may be integrally formed with the handle 6.

Figure 5:
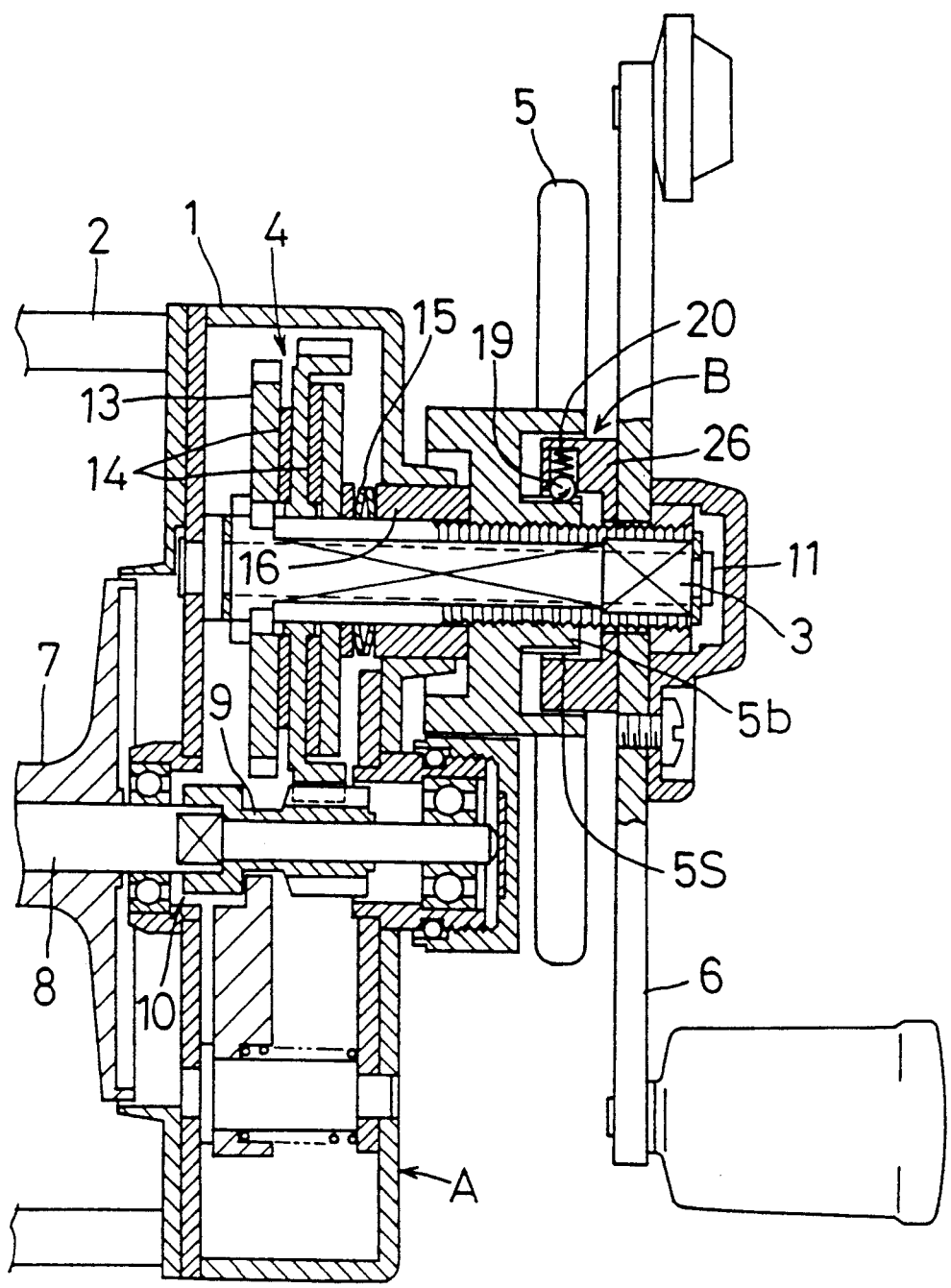
FIG. 5 is a cross section of a further embodiment of the click mechanism.

Furthermore, the present invention may be practiced as shown in FIG. 5. In this embodiment, the drag control member 5 is directly screwed to the handle shaft 3 and has a member 5b defining a concavo-convex surface 5S in an outer periphery thereof. The ball member 19 engageable with and disengageable from the concavo-convex surface 5S is supported by a member 26 provided in the handle shaft 3. Further, the ball member 19 may be urged by a coil spring 20. In the above-discussed alternative embodiments, the members having the same functions as the first embodiment are provided with the same reference numbers.

What is claimed is:

1. A two-bearing reel comprising:
   a handle shaft;
   a drag control member, said control member being rotatable relative to said handle shaft;
   a click mechanism including a tubular portion having an inner periphery, said inner periphery having a peripherally extending concavo-convex surface, said concavo-convex surface being rotatable in unison with said handle shaft;
   said click mechanism further including a rollable ball member engageable with said concavo-convex surface; and
   said click mechanism further including an elastic member having an arcuate shape at least partially surrounding said handle shaft, said elastic member having a first end supported by said drag control member and a second end supporting said ball member, said elastic member urging the ball member in a radial direction with respect to said handle shaft; and
   wherein said click mechanism is disposed between said handle shaft and said drag control member, and wherein said click mechanism is arranged to generate a click sound when said drag control member is rotated relative to said handle shaft, with said ball member rolling and repeatedly coming into and out of engagement with said concavo-convex surface as said drag control member is rotated relative to said handle shaft.

2. A two-bearing reel as claimed in claim 1 wherein said elastic member comprises a plate spring having a contact portion, said contact portion including a groove for stabilizing the position of the ball member relative to said elastic member.

3. A two-bearing reel as claimed in claim 1 wherein said handle shaft is hollow and has a support shaft inserted therein, said support shaft being supported by a side case forming a reel body whereby said handle shaft is indirectly supported by the side case.

4. A two-bearing reel comprising:
   a handle shaft;
   a drag control member having an inner periphery with a peripherally extending concavo-convex surface, said drag control member being rotatable relative to said handle shaft; and
   a click mechanism including a tubular portion that is rotatable in unison with said handle shaft, a rollable ball member engageable with said concavo-convex surface, and an elastic member having an arcuate shape at least partially surrounding said handle shaft, said elastic member having a first end supported by said tubular portion and a second end supporting said ball member, said elastic member urging the ball member in a radial direction with respect to said handle shaft; and
   wherein said click mechanism is disposed between said handle shaft and said drag control member, and wherein said click mechanism is arranged to generate a click sound when said drag control member is rotated relative to said handle shaft, with said ball member rolling and repeatedly coming into and out of engagement with said concavo-convex surface as said drag control member is rotated relative to said handle shaft.

5. A two-bearing reel as claimed in claim 4 wherein said elastic member comprises a plate spring having contact portion, said contact portion including a groove for stabilizing the position of the ball member relative to said elastic member.

6. A two-bearing reel as claimed in claim 4 wherein said handle shaft is hollow and has a support shaft inserted therein, said support shaft being supported by a side case forming a reel body, whereby said handle shaft is indirectly supported by the side case.

* * * * *